United States Patent
Fuchs et al.

(10) Patent No.: US 6,810,702 B2
(45) Date of Patent: Nov. 2, 2004

(54) DEVICE FOR LOCKING THE STEERING SPINDLE OF A VEHICLE

(75) Inventors: Carsten Fuchs, Chemnitz (DE); Friedrich Pieper, Töging (DE); Patrik Jaillant, Feldkirch-Tisis (AT); Günther Wagner, Röthis (AT)

(73) Assignees: Audi AG, Ingolstadt (DE); Huf Hulsbeck & Furst GmbH & Co., KG, Velbert (DE); Krupp Presta AG Press-und Stanzwerk, Eschen (LI)

( * ) Notice: Subject to any disclaimer, the term of this patent is extended or adjusted under 35 U.S.C. 154(b) by 0 days.

(21) Appl. No.: 10/181,932

(22) PCT Filed: Oct. 30, 2001

(86) PCT No.: PCT/EP01/12522

§ 371 (c)(1),
(2), (4) Date: Jul. 30, 2002

(87) PCT Pub. No.: WO02/36396

PCT Pub. Date: May 10, 2002

(65) Prior Publication Data

US 2003/0000265 A1 Jan. 2, 2003

(30) Foreign Application Priority Data

Oct. 30, 2000 (DE) .......................................... 100 53 753

(51) Int. Cl.⁷ .............................................. B60R 25/02
(52) U.S. Cl. .............................. 70/252; 70/184; 70/275
(58) Field of Search .................. 70/180–189, 251–252, 70/257

(56) References Cited

U.S. PATENT DOCUMENTS

| | | | | |
|---|---|---|---|---|
| 4,413,491 A | * | 11/1983 | Thirion | 70/252 |
| 4,552,000 A | * | 11/1985 | Lipschutz | 70/185 |
| 4,854,141 A | * | 8/1989 | Haldric et al. | 70/182 |
| 6,034,442 A | | 3/2000 | Mostrom | |
| 6,107,694 A | | 8/2000 | Mostrom | |
| 6,233,986 B1 | * | 5/2001 | Suzuki et al. | 70/186 |

FOREIGN PATENT DOCUMENTS

| | | | |
|---|---|---|---|
| DE | 195 00 682 C1 | 2/1996 | |
| DE | 196 21 326 C1 | 10/1997 | |
| EP | 0 265 826 | 10/1987 | |
| EP | 0 268 879 | 11/1987 | |
| EP | 268879 A1 * | 6/1988 | ........... B60R/25/02 |
| EP | 0 918 000 A1 | 5/1999 | |
| JP | 03125650 A * | 5/1991 | ........... B60R/25/02 |

* cited by examiner

Primary Examiner—Daniel P. Stodola
Assistant Examiner—Christopher Boswell
(74) Attorney, Agent, or Firm—Bacon & Thomas, PLLC

(57) ABSTRACT

A lock for irrotationally locking a motor-vehicle steering column enclosed by a tubular housing, the lock including a lock element displaceable to-and-fro between a locked and a released position and further a drive motor driving the locking element. For greater compactness, to offer enhanced security against theft, and to leave unhampered the telescoping of the steering pillar composed of steering column and tubular housing, further to reduce the danger of knee injury in case of accident, the locking element is mounted in the vicinity of the steering-wheel side end of the steering column inside the tubular housing, and the drive motor is mounted next to the foot-space side end of the steering column, and the drive motor cooperates with the locking element through a connecting element arrange inside the tubular housing.

11 Claims, 2 Drawing Sheets

DEVICE FOR LOCKING THE STEERING SPINDLE OF A VEHICLE

BACKGROUND OF THE INVENTION

A. Field

Figure 1:
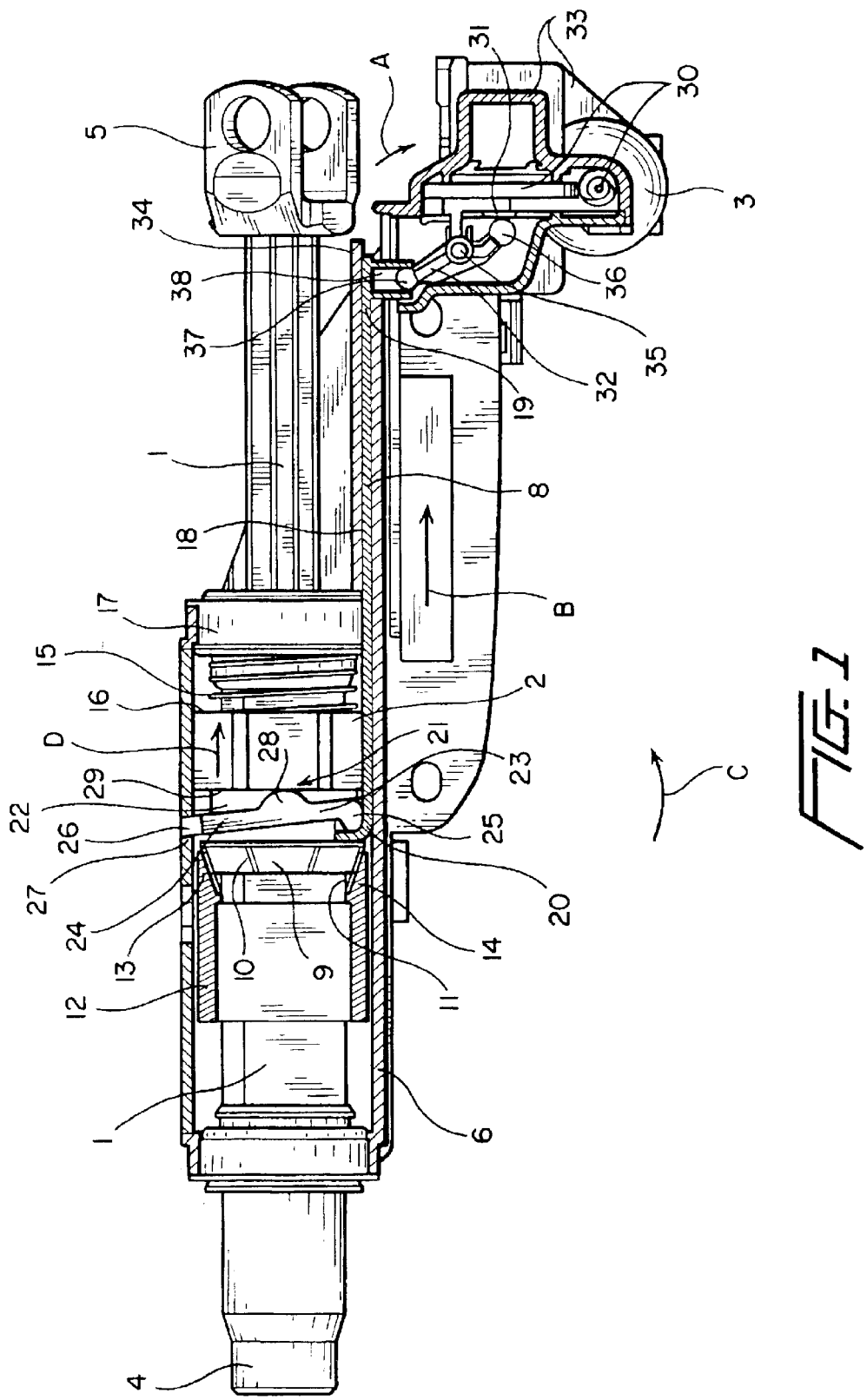

The invention relates to a lock for irrotationally locking a motor-vehicle steering column enclosed by a tubular housing, said lock being fitted with a locking element displaceable in a to-and-fro manner between a locked and a released position and with a drive motor driving said locking element.

B. Related Art

A number of different designs already are known for means irrotationally locking motor-vehicle steering columns.

Illustratively, as regards one design of the prior art, the locking element and the said drive motor are configured at the lower steering-column end within a common housing. The steering column runs through the associated tubular housing, and through an opening in a metal floor panel of the motor vehicle and through said common housing screwed onto the metal floor panel on the side away from said tubular housing. The locking element encloses the steering column and is supported in axially displaceable but irrotational manner in said common housing and is fitted with locking teeth which may be made to mesh with matching locking teeth of the steering column. Said drive motor is an electric motor affixed to the inside of said common housing and cooperates by a mechanical linkage or by a lever with said locking element (EP 0 265 826 B).

In another known design of the kind of lock discussed herein, the locking element and the drive motor are mounted close to one another and outside the tubular housing enclosing the steering column. The locking element is in the shape of a bush and is mounted on the tubular housing in an axially displaceable manner and is fitted with at least one resilient locking tooth that can be made to mesh with rigid locking teeth of the steering column. Said drive motor is an electric motor externally affixed to the tubular housing and by means of a cam-collar cooperates with the locking element in order to displace the latter against the force of a helical compression spring enclosing the steering column in a manner such that the locking element's locking tooth can be disengaged from the steering column's locking teeth to allow rotation of the steering column. The cam-collar is rotatably supported on the tubular housing and is fitted with circumferential teeth meshing with a pinion affixed on the shaft of the electric motor (DE 195 00 682 C).

Again a design of the above discussed type of lock is known wherein the locking element and the drive motor are configured near each other in a common housing through which the steering column runs. The locking element consists of a shaft rotatably supported inside the housing and fitted with two radially projecting locking protrusions. The shaft runs tangentially relative to a locking ring which is affixed to the steering column and which is fitted with locking teeth with which the shaft's locking protrusions can be made to engage. The drive motor is an electric motor affixed in the housing and cooperating via a gearing unit with said shaft (DE 196 21 326 C).

BRIEF SUMMARY OF THE INVENTION

The objective of the present invention is a lock of the initially mentioned kind which is characterized by compactness, by offering extraordinary vehicle theft-protection, by unhampered ability to telescope of the steering pillar composed of steering column and tubular housing, and by preserving the driver in the event of accident from knee injuries because it is located outside the region containing the knees.

An illustrative embodiment of the lock of the invention is described below in relation to the attached drawings.

Figure 2:
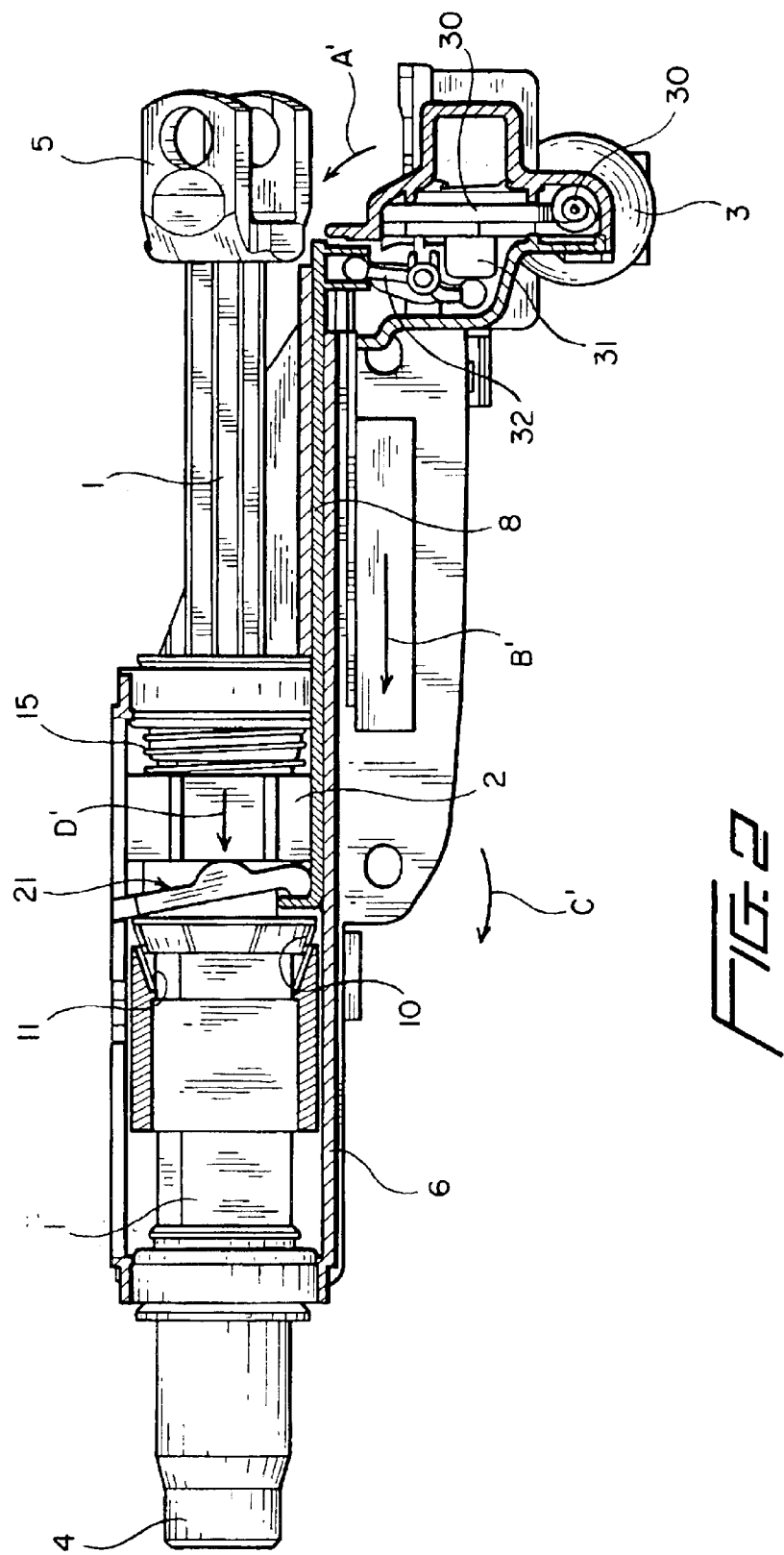

FIG. 1 is a side view in partly longitudinal section, the locking element being in its locked position, and FIG. 2 is a view similar to that of FIG. 1, but with the locking element being in its released position.

DETAILED DESCRIPTION

The shown lock is used to irrotationally lock a motor-vehicle steering column 1 and it is fitted with a locking element 2 which can be moved to-and-fro between the locked position of FIG. 1 and the released position of FIG. 2 and is driven by drive motor 3.

The steering column 1 is enclosed between its two ends 4, 5 by a tubular housing 6. The motor-vehicle steering wheel is mounted on the end 4 of the steering column 1 on the left in FIGS. 1 and 2. The end 5 of the steering column 1 shown on the right in FIGS. 1 and 2 is connected near the motor-vehicle foot space to said vehicle's steering gear unit.

The locking element 2 is mounted in the vicinity of the steering-wheel side end 4 of the steering column 1 within the tubular housing 6. The drive motor 3 is mounted next to the foot-space side end 5 of the steering column 1, namely outside the tubular housing 6. The drive motor 3 cooperates by a connecting element 8 with the locking element 2, said connecting element being mounted inside said tubular housing 6.

The locking element 2 is in the form of a bush and encloses the steering column 1, being supported inside the tubular housing 6 in an axially displaceable but irrotational manner, as a result of which the locking element 2 is prevented from rotating inside the tubular housing 6 but can move to-and-fro along the steering column 1. The locking element 2 is conical at the left end 9 as shown in FIGS. 1 and 2 and is fitted at the end 9, which tapers toward the steering-wheel side end 4 of the steering column 1, with circumferentially equally spaced outer locking teeth 10 cooperating with corresponding locking teeth 11 of the steering column 1.

The locking teeth 11 of the steering column 1 are provided on a collar 12 affixed to said steering column 1. The collar 12 is fitted at the end 13 adjacent to the locking element 2 with a conical borehole 14 receiving the conical end 9 of the locking element 2. The locking teeth 11 are circumferentially evenly spaced in the borehole 14 of the collar 12, said borehole 14 tapering like the end 9 of the locking element 2 toward the steering-wheel side end 4 of the steering column 1.

The locking element 2 is loaded by a helical compression spring 15 toward the collar 12 of the steering column 1. This helical compression spring 15 encloses the steering column 1 at that side of the locking element 2 which is away from the collar 12 and rests by one end against the end surface 16 of the locking element 2, which end surface 16 faces the foot-space side end 5 of said column 1, and it rests by its other end against a ring 17 affixed in the tubular housing 6.

The connecting element 8 between the drive motor 3 and the locking element 2 is in the form of an elongated plate which runs parallel to the steering column 1 within the tubular housing 6 and is supported in an axially displaceable manner in a groove 18 of the tubular housing 6. The drive motor 3 cooperates with the right end 19 shown in FIGS. 1 and 2 of the connecting element 8 which in turn cooperates with the left end 20 shown in FIGS. 1 and 2 by means of a U-shaped pivoting bail 21 with the locking element 2.

The U-shaped pivotable bail 21 is received in an external annular groove 22 of the locking element 2 and encloses the locking element 2 from above in FIGS. 1, 2. The pivotable bail 21 comprises two side legs 23 and a crossbar 24 linking the two legs 23. By its adjacent end 20, the connecting element 8 acts on the two free ends 25 of the legs 23. The pivotable bail 21 is pivotably supported on the tubular housing 6 at that side of the locking element 2 which is away from the connecting element 8, namely by means of a protrusion 26 projecting from the center of the crossbar 24 and pointing away from the legs 23 and entering an aperture 27 of the tubular housing 6. On that side where the connecting element 8 and the helical compression spring 15 are situated, and between their free ends 25 and the crossbar 24, the two legs 23 each are fitted with a convex boss 28 resting against the adjacent side surface 29 of the annular groove 22.

The drive motor 3 is an electric motor cooperating by means of a gear unit 30, a slider 31 and a two-arm pivot lever 32 with the connecting element 8. The drive motor 3, the gearing unit 30, the slider 31 and the pivot lever 32 are mounted in a common housing 33 which is affixed externally to the tubular housing 6, that is at its foot-space side end 34. The pivot lever 32 is pivotably supported on an arbor 35 mounted in the housing 33 in such manner as to rest by one end 36 against the slider 31 and to engage by the other end 37 in a recess 38 on the adjacent end 19 of the connecting element 8.

The shown lock irrotationally locking the motor-vehicle steering column 1 operates as follows:

The steering column 1 is shown locked in FIG. 1. The locking element 2 assumes its locked position wherein its locking teeth 10 engage the gaps between the locking teeth 11 of the steering column 1, as a result of which this steering column 1 is coupled to the tubular housing 6 within which it is irrotational. To unlock the steering column 1, the drive motor 3 is turned ON in such a way that, by means of the gear unit 30 and the slider 31, it shall pivot the pivot lever 32 in the direction of the arrow A. In the process the pivot lever 32 displaces the connecting element 8 in the direction of the arrow B and said connecting element 8 in turn pivots the pivotable bail 21 in the direction of the arrow C. In the process, the pivotable bail 21 displaces the locking element 2 in the direction of the arrow D against the loading from the helical compression spring 15 into its released position wherein the locking teeth 10 of the locking element 2 are disengaged from the locking teeth 11 of the steering column 1, and as a result the steering column 1 now can be rotated inside the tubular housing.

Consequently the state shown in FIG. 2 has been achieved. In order to relock the steering column 1, the drive motor 3 will be powered next, as a result of which the pivot lever 32, the connecting element 8, the pivotable bail 21 and the locking element 2, biased by the helical compression spring 15, respectively are displaced in the direction of the arrow A', B', C' and D' and thereby the state of FIG. 1 is restored.

What is claimed is:

1. A lock for irrotationally locking an elongated motor-vehicle steering column (1) enclosed by an elongated tubular housing (6) and having a steering wheel side end (4) located towards one longitudinal end of the column (1) and a longitudinally spaced foot space side end (5) located towards an opposed longitudinal end of the column (1), said lock being fitted with a locking element (2) displaceable to-and-fro between a locked and a released position and further with a drive motor (3) to drive the locking element (2), wherein the locking element (2) is mounted in the vicinity of the steering-wheel side end (4) of the steering column (1) within the tubular housing (6) and wherein the drive motor (3) is mounted next to the foot-space side end (5) of the steering column (1) longitudinally spaced from said locking element and further wherein the drive motor (3) cooperates with the locking element (2) by means of a connecting element (8) arranged so as to extend longitudinally inside the tubular housing (6).

2. Lock as claimed in claim 1, wherein the locking element (2) is formed in the shape of a bush and is fitted with locking teeth (10) and encloses the steering column (1) and is axially displaceable in a manner such that in the locked position the locking teeth (10) lock the steering column (1) to the tubular housing (6).

3. Lock as claimed in claim 2, wherein the bush-shaped locking element (2) is supported in irrotational but axially freely displaceable manner inside the tubular housing (6) and wherein its locking teeth (10) cooperate with matching locking teeth (11) connected to the steering column (1).

4. Lock as claimed in claim 2, wherein the connecting element (8) cooperates by means of a U-shaped pivotable bail (21) with the bush-shaped locking element (2), said bail (21) enclosing said locking element (2) and being pivotably supported on the tubular housing (6) at the center of a crossbar (24) of the bail (21) on the side of the locking element (2) away from the connecting element (8), the connecting element (8) acting on the free ends (25) of the two legs (23) of the pivotable bail (21) and the legs (23) in turn acting between their free ends (25) and the crossbar (24) of the pivotable bail (21) on the locking element (2).

5. Lock as claimed in claim 1, wherein the connecting element (8) directly cooperates with the locking element (2).

6. Lock as claimed in claim 1, wherein the locking element (2) is spring-loaded into the locked position.

7. Lock as claimed in claim 6, wherein the locking element (2) is formed in the shape of a bush and is fitted with locking teeth (10) and encloses the steering column (1) and is axially displaceable in a manner such that in the locked position the locking teeth (10) lock the steering column (1) to the tubular housing (6), and further wherein the bush-shaped locking element (2) is biased by a helical compression spring (15) into the locked position, said spring (15) enclosing the steering column (1) and resting on one hand on the tubular housing (6) and on the other hand on the locking element (2).

8. Lock as claimed in claim 1, wherein the drive motor (3) is an electric motor.

9. Lock as claimed in claim 1, wherein the connecting element (8) is an elongated plate which is axially displaceable parallel to the steering column (1).

10. Lock as claimed in claim 9, wherein the drive motor (3) cooperates by means of a two-arm pivot lever (32) with the connecting element (8), said lever (32) being pivotable about an arbor (35) affixed to the tubular housing (61).

11. Lock as claimed in claim 10, wherein the tubular housing (6) has a foot space side end (34) and wherein the drive motor (3) and the pivoting lever (32) are mounted in a common housing (33) which is externally affixed to the foot-space side end (34) of the tubular housing (6) and which is provided with the pivot arbor (35) of the pivoting lever (32).

* * * * *